United States Patent
Kwon et al.

(10) Patent No.: US 9,324,978 B2
(45) Date of Patent: Apr. 26, 2016

(54) PACKAGING FOR CABLE-TYPE SECONDARY BATTERY AND CABLE-TYPE SECONDARY BATTERY COMPRISING THE SAME

(71) Applicant: LG Chem, Ltd., Seoul (KR)

(72) Inventors: Yo-Han Kwon, Daejeon (KR); Byung-Hun Oh, Daejeon (KR); Sang-Hun Kim, Daejeon (KR); Je-Young Kim, Daejeon (KR); Hyo-Mi Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/445,144

(22) Filed: Jul. 29, 2014

(65) Prior Publication Data

US 2014/0335391 A1     Nov. 13, 2014

Related U.S. Application Data

(63) Continuation of application No. PCT/KR2014/003737, filed on Apr. 28, 2014.

(30) Foreign Application Priority Data

Apr. 29, 2013  (KR) .................. 10-2013-0047473
Apr. 28, 2014  (KR) .................. 10-2014-0050843

(51) Int. Cl.
*H01M 10/04* (2006.01)
*H01M 2/08* (2006.01)
(Continued)

(52) U.S. Cl.
CPC .............. *H01M 2/08* (2013.01); *H01M 2/022* (2013.01); *H01M 2/0287* (2013.01); *H01M 4/75* (2013.01);
(Continued)

(58) Field of Classification Search
None
See application file for complete search history.

(56) References Cited

U.S. PATENT DOCUMENTS

| 3,079,456 A | 2/1963 | Pawlak |
| 4,522,897 A | 6/1985 | Walsh |

(Continued)

FOREIGN PATENT DOCUMENTS

| EP | 2770559 A1 | 8/2014 |
| JP | H07220759 A | 8/1995 |

(Continued)

OTHER PUBLICATIONS http://www.merriam-webster.com/dictionary/laminate.*

(Continued)

*Primary Examiner* — Patrick Ryan
*Assistant Examiner* — Christopher Domone
(74) *Attorney, Agent, or Firm* — Lerner, David, Littenberg, Krumholz & Mentlik, LLP

(57) ABSTRACT

The present disclosure relates to a packaging for a cable-type secondary battery, surrounding an electrode assembly in the cable-type secondary battery, the packaging having a moisture-blocking layer comprising sealant polymer layers on both outer surfaces of a moisture-blocking film and a moisture-blocking film disposed between the sealant polymer layers, wherein the moisture-blocking layer is a tube form surrounding the electrode assembly, and the sealant polymer layers in both ends of the moisture-blocking layer are overlapped and adhered with each other in a predetermined part. The packaging according to the present disclosure can be used in a cable-type secondary battery to block moisture from being infiltrated into an electrode assembly, thereby improving the life characteristics of the battery and preventing the deterioration of battery performances.

30 Claims, 7 Drawing Sheets

(51) Int. Cl.
*H01M 2/02* (2006.01)
*H01M 4/75* (2006.01)
*H01M 10/052* (2010.01)
*H01M 4/02* (2006.01)
*H01M 10/058* (2010.01)

(52) U.S. Cl.
CPC ......... *H01M 10/0422* (2013.01); *H01M 10/052* (2013.01); *H01M 10/058* (2013.01); *H01M 2002/0205* (2013.01); *H01M 2004/025* (2013.01)

(56) References Cited

U.S. PATENT DOCUMENTS

| | | | |
|---|---|---|---|
| 5,008,165 | A | 4/1991 | Schmode |
| 5,077,153 | A | 12/1991 | Grange-Cossou et al. |
| 5,478,676 | A | 12/1995 | Turi et al. |
| 6,165,645 | A | 12/2000 | Nishimura et al. |
| 6,280,879 | B1 | 8/2001 | Andersen et al. |
| 6,399,253 | B1 | 6/2002 | Chang et al. |
| 6,403,263 | B1 | 6/2002 | Roach |
| 6,723,467 | B2 | 4/2004 | Yoshida et al. |
| 7,682,740 | B2 | 3/2010 | Yong et al. |
| 8,895,189 | B2 | 11/2014 | Zhamu et al. |
| 8,945,752 | B2* | 2/2015 | Kwon et al. ............... 429/127 |
| 2001/0053475 | A1 | 12/2001 | Ying et al. |
| 2003/0215716 | A1 | 11/2003 | Suzuki et al. |
| 2005/0069774 | A1 | 3/2005 | Miyazaki et al. |
| 2005/0112461 | A1 | 5/2005 | Amine et al. |
| 2005/0118508 | A1 | 6/2005 | Yong et al. |
| 2005/0155216 | A1 | 7/2005 | Cho et al. |
| 2006/0008702 | A1 | 1/2006 | Cheon et al. |
| 2006/0110661 | A1 | 5/2006 | Lee et al. |
| 2006/0199294 | A1 | 9/2006 | Fujikawa et al. |
| 2007/0207379 | A1 | 9/2007 | Hatta et al. |
| 2007/0231682 | A1* | 10/2007 | Aoyama et al. ............... 429/160 |
| 2008/0032170 | A1 | 2/2008 | Wainright et al. |
| 2008/0089006 | A1 | 4/2008 | Zhong et al. |
| 2009/0047575 | A1 | 2/2009 | Abe et al. |
| 2009/0107746 | A1 | 4/2009 | Horie et al. |
| 2010/0216016 | A1* | 8/2010 | Seino et al. ............... 429/185 |
| 2010/0261065 | A1 | 10/2010 | Babinec et al. |
| 2010/0273051 | A1 | 10/2010 | Choi et al. |
| 2010/0273056 | A1 | 10/2010 | Kanda et al. |
| 2010/0285341 | A1* | 11/2010 | Yun et al. ............... 429/94 |
| 2010/0291442 | A1 | 11/2010 | Wang et al. |
| 2010/0316898 | A1 | 12/2010 | Howard et al. |
| 2011/0039140 | A1 | 2/2011 | Miyahisa et al. |
| 2011/0068001 | A1 | 3/2011 | Affinito et al. |
| 2011/0111277 | A1 | 5/2011 | Bessho et al. |
| 2011/0223470 | A1 | 9/2011 | Tomantschger |
| 2012/0009331 | A1* | 1/2012 | Kwon et al. ............... 427/58 |
| 2012/0034509 | A1 | 2/2012 | Bae et al. |
| 2012/0040231 | A1* | 2/2012 | Hagiwara et al. ............ 429/136 |
| 2012/0040235 | A1 | 2/2012 | Cho et al. |
| 2012/0077109 | A1 | 3/2012 | Hong et al. |
| 2012/0100412 | A1 | 4/2012 | Kwon et al. |
| 2012/0107658 | A1 | 5/2012 | Kwon et al. |
| 2012/0115040 | A1 | 5/2012 | Kwon et al. |
| 2012/0115259 | A1 | 5/2012 | Lee et al. |
| 2012/0141877 | A1 | 6/2012 | Choi et al. |
| 2012/0148902 | A1 | 6/2012 | Kwon et al. |
| 2012/0174386 | A1 | 7/2012 | Katayama et al. |
| 2012/0189914 | A1 | 7/2012 | Hara et al. |
| 2012/0295144 | A1 | 11/2012 | Kwon et al. |
| 2012/0308863 | A1 | 12/2012 | Masumoto et al. |
| 2013/0011742 | A1 | 1/2013 | Park et al. |
| 2013/0089774 | A1 | 4/2013 | Chami |
| 2013/0130107 | A1 | 5/2013 | Uchida |
| 2013/0143126 | A1 | 6/2013 | Jung et al. |
| 2013/0288150 | A1 | 10/2013 | Hodges et al. |
| 2013/0344363 | A1 | 12/2013 | Upadhyaya |
| 2013/0344368 | A1 | 12/2013 | Kwon et al. |
| 2014/0011065 | A1 | 1/2014 | Kwon et al. |
| 2014/0030569 | A1 | 1/2014 | Kwon et al. |
| 2014/0170453 | A1 | 6/2014 | Kwon et al. |
| 2014/0170454 | A1 | 6/2014 | Kwon et al. |
| 2014/0178726 | A1 | 6/2014 | Kwon et al. |
| 2014/0186672 | A1 | 7/2014 | Kwon et al. |
| 2014/0186673 | A1 | 7/2014 | Kwon et al. |
| 2014/0212720 | A1 | 7/2014 | Kwon et al. |
| 2014/0234681 | A1 | 8/2014 | Kwon et al. |
| 2014/0370351 | A1 | 12/2014 | Kwon et al. |

FOREIGN PATENT DOCUMENTS

| | | | |
|---|---|---|---|
| JP | 11297360 | | 10/1999 |
| JP | 2000311693 | A | 11/2000 |
| JP | 2004281156 | A | 10/2004 |
| JP | 2005038612 | A | 2/2005 |
| JP | 2006069559 | A | 3/2006 |
| JP | 2007-265989 | A | 10/2007 |
| JP | 2009064767 | A | 3/2009 |
| JP | 2010067524 | A | 3/2010 |
| JP | 2010160984 | A | 7/2010 |
| JP | 2010165471 | A | 7/2010 |
| JP | 2011054502 | A | 3/2011 |
| JP | 2011192620 | A | 9/2011 |
| JP | 2013020410 | A | 1/2013 |
| KR | 20050043674 | A | 5/2005 |
| KR | 20050075811 | A | 7/2005 |
| KR | 100582557 | B1 | 5/2006 |
| KR | 2008-0005627 | A | 1/2008 |
| KR | 20080010166 | A | 1/2008 |
| KR | 20080015373 | A | 2/2008 |
| KR | 100918751 | B1 | 9/2009 |
| KR | 20100117403 | A | 11/2010 |
| KR | 20100130818 | A | 12/2010 |
| KR | 20110038038 | A | 4/2011 |
| KR | 20110136448 | A | 12/2011 |
| KR | 20120000708 | A | 1/2012 |
| KR | 20120014542 | A | 2/2012 |
| KR | 2012-0094871 | A | 8/2012 |
| KR | 2012-0103515 | A | 9/2012 |
| KR | 2013-0040166 | A | 4/2013 |
| KR | 20130040160 | A | 4/2013 |
| KR | 20130045219 | A | 5/2013 |
| KR | 20130045220 | A | 5/2013 |
| WO | 2005098994 | A1 | 10/2005 |
| WO | 2005112151 | A1 | 11/2005 |
| WO | 2011159083 | A2 | 12/2011 |
| WO | 2012017546 | A1 | 2/2012 |
| WO | 2012088643 | A1 | 7/2012 |

OTHER PUBLICATIONS

International Search Report for Application No. PCT/KR2014/004042 dated Sep. 11, 2014.
International Search Report for Application No. PCT/KR2014/004043 dated Sep. 11, 2014.
International Search Report for Application No. PCT/KR2014/004044 dated Oct. 1, 2014.
International Search Report for Application No. PCT/KR2014/004046 dated Oct. 1, 2014.
International Search Report for Application No. PCT/KR2014/004048 dated Sep. 12, 2014.
International Search Report from PCT/KR2014/004047, dated Sep. 3, 2014.
Machine Enlish Translation of JP 2005-038612.
Original Japanese text of JP 2005-038612.
U.S. Appl. No. 14/472,635, filed Aug. 29, 2014.
U.S. Appl. No. 14/472,692, filed Aug. 29, 2014.
U.S. Appl. No. 14/477,305, filed Sep. 4, 2014.
U.S. Appl. No. 14/477,317, filed Sep. 4, 2014.
U.S. Appl. No. 14/479,713, filed Sep. 8, 2014.
U.S. Appl. No. 14/479,821, filed Sep. 8, 2014.
U.S. Appl. No. 14/479,856, filed Sep. 8, 2014.
U.S. Appl. No. 14/480,914, filed Sep. 9, 2014.
U.S. Appl. No. 14/480,919, filed Sep. 9, 2014.
U.S. Appl. No. 14/480,926, filed Sep. 9, 2014.
U.S. Appl. No. 14/483,318, filed Sep. 11, 2014.

(56) References Cited

OTHER PUBLICATIONS

U.S. Appl. No. 14/483,328, filed Sep. 11, 2014.
U.S. Appl. No. 14/483,348, filed Sep. 11, 2014.
U.S. Appl. No. 14/483,373, filed Sep. 11, 2014.
U.S. Appl. No. 14/484,401, filed Sep. 12, 2014.
U.S. Appl. No. 14/484,454, filed Sep. 12, 2014.
U.S. Appl. No. 14/484,463, filed Sep. 12, 2014.
U.S. Appl. No. 14/484,472, filed Sep. 12, 2014.
U.S. Appl. No. 14/484,487, filed Sep. 12, 2014.

Y.H. Kwon, S.-W. Woo, H.-R. Jung, H.K. Yu, K. Kim, B.H. Oh, S. Ahn, S.-Y. Lee, S.-Wan Song, J. Cho, H.-C. Shin, J.Y. Kim, Cable-Type Flexible Lithium Ion Battery Based on Hollow Multi-Helix Electrodes, Adv. Mater. 2012, 24, 5192-5197.

International Search Report from PCT/KR2014/003737, dated Aug. 14, 2014.

Extended Search Report from European Application No. 14733954.3, dated Jan. 12, 2016.

International Search Report for Application No. PCT/KR2014/004039 dated Sep. 11, 2014.

\* cited by examiner

PACKAGING FOR CABLE-TYPE SECONDARY BATTERY AND CABLE-TYPE SECONDARY BATTERY COMPRISING THE SAME

CROSS-REFERENCE TO RELATED APPLICATION

This application is a continuation of International Application No PCT/KR2014/003737 filed on Apr. 28, 2014, which claims priority under 35 USC 119(a) to Korean Patent Application No. 10-2013-0047473 filed in the Republic of Korea on Apr. 29, 2013 and Korean Patent Application No. 10-2014-0050843 filed in the Republic of Korea on Apr. 28, 2014, which are incorporated herein by reference.

TECHNICAL FIELD

The present disclosure relates to a packaging for a cable-type secondary battery, more particularly to a packaging for a cable-type secondary battery, which has a superior moisture-blocking property, and a cable-type secondary battery comprising the packaging.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NIMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter. However, there have been no disclosures specifically providing a packaging for protecting such a cable-type battery. Particularly, if tube packaging made of general polymeric materials is used, moisture or air may permeate the micropores of the polymer to contaminate an electrolyte in batteries and deteriorate the performances of batteries. More specifically, when using an electrolyte solution which contains $LiPF_6$ as a lithium salt, it brings into reaction with moisture introduced within batteries, thereby leading to the deterioration of battery performances.

DISCLOSURE

Technical Problem

The present disclosure is designed to solve the above-mentioned problems, and therefore it is an object of the present disclosure to provide a packaging for a cable-type battery, which can effectively inhibit the reaction of an electrolyte and moisture in the cable-type battery and prevent the deterioration of battery performances. Also, it is another object of the present disclosure to provide a cable-type battery comprising the packaging having such a superior moisture-blocking property.

Technical Solution

In order to achieve the objects, in accordance with one aspect of the present disclosure, there is provided a packaging for a cable-type secondary battery, surrounding an electrode assembly in the cable-type secondary battery, the packaging having a moisture-blocking layer comprising sealant polymer layers on both outer surfaces of a moisture-blocking film and a moisture-blocking film disposed between the sealant polymer layers, wherein the moisture-blocking layer is a tube form surrounding the electrode assembly, and the sealant polymer layers in both ends of the moisture-blocking layer are overlapped and adhered with each other in a predetermined part.

According to one embodiment of the present disclosure, the moisture-blocking layer may comprise a metal sheet or a polymer sheet.

According to another embodiment of the present disclosure, the metal sheet may comprise any one selected from the group consisting of iron (Fe), carbon (C), chrome (Cr), manganese (Mn), nickel (Ni), copper (Cu), aluminum (Al), an equivalent thereof and an alloy of two or more thereof.

According to another embodiment of the present disclosure, the polymer sheet may be made of at least one selected from the group consisting of a polyethylene (PE), polypropylene, a polymer clay composite and a liquid crystal polymer.

According to another embodiment of the present disclosure, the sealant polymer layers may comprise any one selected from the group consisting of a copolymer of polypropylene-acrylic acid, a copolymer of polyethylene-acrylic acid, polypropylene chloride, a terpolymer of polypropylene-butylene-ethylene, polypropylene, polyethylene, a copolymer of ethylene-propylene, and a mixture thereof.

According to another embodiment of the present disclosure, the moisture-blocking layer may comprise an adhesive layer between the moisture-blocking film and the sealant polymer layers.

According to a preferred embodiment of the present disclosure, the packaging may further comprise a heat-shrinkable tube that surrounds the outer surface of the moisture-blocking layer.

According to another embodiment of the present disclosure, the heat-shrinkable tube may comprise at least one selected from the group consisting of polyolefins, polyesters, fluoro-containing resins, and polyvinyl chloride (PVC).

According to a preferred embodiment of the present disclosure, the moisture-blocking layer may comprise a mechanical supporting layer on at least one surface between the moisture-blocking film and both sealant polymer layers.

According to another embodiment of the present disclosure, the mechanical supporting layer may be at least one polymer selected from the group consisting of polyolefins, polyesters, polyimides and polyamides.

According to another embodiment of the present disclosure, in the case that the mechanical supporting layer is comprised, the moisture-blocking layer may comprise a metal sheet.

According to a preferred embodiment of the present disclosure, an adhesive layer may be further formed between the moisture-blocking film and the mechanical supporting layer.

In accordance with another aspect of the present disclosure, there is provided a cable-type secondary battery, comprising: an electrode assembly having a horizontal cross section of a predetermined shape and extending longitudinally, which comprises an inner electrode including an inner current collector and an inner electrode active material, a separation layer surrounding the inner electrode to prevent a short circuit between electrodes, and an outer electrode including an outer current collector formed to surround the outer surface of the separation layer and an outer electrode active material; and the above-mentioned packaging surrounding the outer surface of the electrode assembly closely.

According to another embodiment of the present disclosure, the packaging for a cable-type secondary battery may be formed by closely winding the outer surface of the electrode assembly so that both ends of the electrode assembly are exposed to the outside.

According to another embodiment of the present disclosure, the inner electrode of the electrode assembly may comprise a core for supplying lithium ions, which comprises an electrolyte, at least one wire-form inner current collector that is wound to surround the outer surface of the core for supplying lithium ions, and an inner electrode active material layer.

According to another embodiment of the present disclosure, the inner electrode may have a structure that the inner electrode active material layer is formed on the whole surface of the wire-form inner current collector; or a structure that the inner electrode active material layer is formed to surround the outer surface of the wound wire-form inner current collector.

According to another embodiment of the present disclosure, the inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

According to another embodiment of the present disclosure, the outer electrode may be formed in a structure having a sheet-form outer current collector wound to surround the outer surface of the separation layer, and an outer electrode active material layer surrounding the outer surface of the sheet-form outer current collector; a structure having an outer electrode active material layer surrounding the outer surface of the separation layer, and a sheet-form outer current collector wound to surround the outer surface of the outer electrode active material layer; a structure having a sheet-form outer current collector wound to surround the outer surface of the separation layer, and an outer electrode active material layer surrounding the outer surface of the sheet-form outer current collector and coming into contact with the separation layer; or a structure having an outer electrode active material layer surrounding the outer surface of the separation layer, and a sheet-form outer current collector that is included inside the outer electrode active material layer by being covered therein and wound to surround the outer surface of the separation layer with spacing apart therefrom.

According to another embodiment of the present disclosure, the outer electrode may be formed by winding a sheet-form outer electrode to surround the outer surface of the separation layer, the sheet-form outer electrode being formed by the bonding of the outer electrode active material layer and the sheet-form outer current collector.

According to another embodiment of the present disclosure, the outer electrode may be a sheet-form outer electrode which comprises an outer current collector, an outer electrode active material layer formed on one surface of the outer current collector, a conductive layer formed on the top surface of the outer electrode active material layer and comprising a conductive material and a binder, a first porous supporting layer formed on the top surface of the conductive layer, and a second supporting layer formed on the other surface of the outer current collector.

According to another embodiment of the present disclosure, the outer current collector may be in the form of a mesh.

According to another embodiment of the present disclosure, the outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

According to another embodiment of the present disclosure, the electrode assembly may be a cable-type secondary battery, comprising a core for supplying lithium ions, which comprises an electrolyte; an inner electrode, comprising one or more wire-form inner current collectors which are wound to surround the outer surface of the core for supplying lithium ions, and an inner electrode active material layer formed on the surface of the wire-form inner current collectors; a separation layer surrounding the outer surface of the inner electrode to prevent a short circuit between electrodes; and a sheet-form outer electrode surrounding the outer surface of the separation layer, and comprising an outer current collector, an outer electrode active material layer formed on one surface of the outer current collector, a conductive layer formed on the top surface of the outer electrode active material layer and comprising a conductive material and a binder, a first porous supporting layer formed on the top surface of the conductive layer, and a second supporting layer formed on the other surface of the outer current collector.

According to another embodiment of the present disclosure, the inner electrode may be an anode or a cathode, and the outer electrode may be a cathode or an anode corresponding thereto.

According to another embodiment of the present disclosure, the separation layer may be an electrolyte layer or a separator.

In accordance with still another aspect of the present disclosure, there is provided a method for preparing a cable-type secondary battery, comprising (S1) providing an electrode assembly having a horizontal cross section of a predetermined shape and extending longitudinally, which comprises an inner electrode, a separation layer surrounding the inner electrode to prevent a short circuit between electrodes, and an outer electrode surrounding the outer surface of the separation layer; (S2) providing a moisture-blocking layer having a length longer than the perimeter of the outer surface of the electrode assembly and comprising sealant polymer layers on both outer surfaces of a moisture-blocking film and a moisture-blocking film disposed between the sealant polymer layers; (S3) surrounding the outer surface of the electrode assembly with the moisture-blocking layer so that the sealant polymer layers in both ends of the moisture-blocking layer are overlapped with each other in a predetermined part; and (S4) bringing the electrode assembly surrounded with the moisture-blocking layer into heat-treatment, thereby adhering the overlapped part of the sealant polymer layers at both ends of the moisture-blocking layer.

According to another embodiment of the present disclosure, the moisture-blocking layer provided in the step (S2) may comprise a mechanical supporting layer on at least one surface between the moisture-blocking film and both sealant polymer layers, and also the moisture-blocking layer provided in the step (S2) may have a structure in which a sealant polymer layer, a mechanical supporting layer, a metal sheet of moisture-blocking layer and another sealant polymer layer are laminated in order.

According to another embodiment of the present disclosure, the step (S4) may comprise inserting the electrode assembly surrounded with the moisture-blocking layer in a heat-shrinkable tube prior to the heat-treatment, thereby bonding the heat-shrinkable tube to the electrode assembly surrounded with the moisture-blocking layer by the shrinkage of the tube, while adhering the overlapped part of the sealant polymer layers at both ends of the moisture-blocking layer.

Advantageous Effects

The packaging for a cable-type secondary battery according to one embodiment of the present disclosure blocks moisture from being infiltrated into an electrode assembly, thereby preventing the contamination of an electrolyte in the cable-type secondary battery, and eventually improving the life characteristics of the battery and preventing the deterioration of battery performances.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Figure 1:
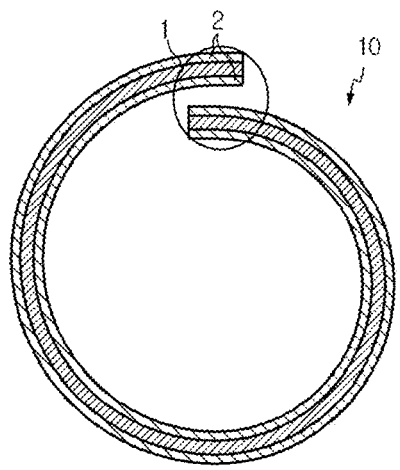
FIG. 1 shows a moisture-blocking layer before heat-treatment according to one embodiment of the present disclosure.

Hereinafter, the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

The present disclosure provides a packaging for a cable-type secondary battery, surrounding an electrode assembly in the cable-type secondary battery, the packaging having a moisture-blocking layer comprising sealant polymer layers on both outer surfaces of a moisture-blocking film and a moisture-blocking film disposed between the sealant polymer layers, wherein the moisture-blocking layer is a tube form surrounding the electrode assembly, and the sealant polymer layers in both ends of the moisture-blocking layer are overlapped and adhered with each other in a predetermined part.

A general tube packaging made of a polymer material may cause the infiltration of moisture into the polymer material through micropores to contaminate an electrolyte in batteries and deteriorate battery performances. In contrast, the packaging of the present disclosure blocks moisture by having a multi-layered moisture-blocking layer comprising sealant polymer layers on both outer surfaces of a moisture-blocking film and a moisture-blocking film disposed between the sealant polymer layers, the sealant polymer layers in both ends of the moisture-blocking layer being overlapped and adhered with each other in a predetermined part.

Figure 2:
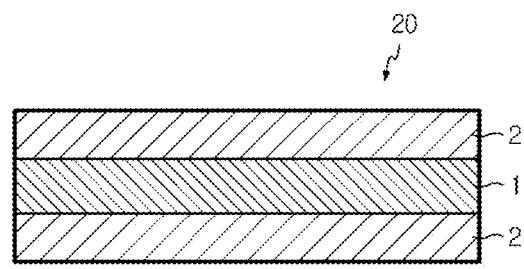
FIG. 2 is a cross-sectional view of a moisture-blocking layer before it surrounds an electrode assembly according to one embodiment of the present disclosure.

Referring to FIGS. 1 and 2, FIG. 1 shows a moisture-blocking layer 10 being bent before both sealant polymer layers thereof are sealed by heat-treatment. More specifically, before sealing by heat-treatment, the moisture-blocking layer 10 comprises a moisture-blocking film 1 and sealant polymer layers 2 on both surfaces of the moisture-blocking film. As shown in FIG. 1, the moisture-blocking layer has a bilaminar part obtained by being overlapped at both ends thereof. That is, the sealant polymer layers in both ends of the moisture-blocking layer are overlapped in a predetermined part.

The moisture-blocking layer of the present disclosure is a structure that sealant polymer layers are formed on both outer surfaces of the moisture-blocking layer, as shown in FIGS. 1 to 5. From this, when the moisture-blocking layer is wound to surround the outer surface of an electrode assembly while being overlapped in a predetermined part, the sealant polymer parts can be present in contact with each other at the overlapped both ends of the moisture-blocking layer. In this state, if heat is applied, the sealant polymer parts present at the overlapped both ends of the moisture-blocking layer are melted to seal the moisture-blocking layer and allow the moisture-blocking layer to be a tube form, i.e., an 'O'-shaped tube. Thus, by the sealing function of the sealant layers, the outer surface of the electrode assembly is completely surrounded with the moisture-blocking layer, thereby preventing the infiltration of moisture into the electrode assembly effectively. As the general packaging for a secondary battery just forms a sealant layer on only one inner surface, when it is applied in a cable-type secondary battery, it conducts the sealing in the form of a shape that both parts of the sealant layer are faced with each other, without the 'O'-shaped tube form, making it difficult for the packaging to be close contact with the electrode assemble, from which empty spaces are generated. Accordingly, the packaging of the present disclosure is applied in secondary batteries, particularly cable-type secondary batteries, it can conduct the sealing in the 'O'-shaped tube form to be complete contact with the electrode assembly of the cable-type secondary batteries, thereby providing increased energy density per unit volume to the cable-type secondary batteries.

As used herein, the term "a predetermined part" refers to a part of sealant layers coming into contact with each other in both ends of the moisture-blocking layer, which is resulted when the moisture-blocking layer having a length longer than the perimeter of the outer surface of an electrode assembly is wound to surround the outer surface of the electrode assembly. For example, the predetermined part may be 1 to 99%, preferably 1 to 70%, more preferably 3 to 50%, most preferably 5 to 30% of the outer surface perimeter of the electrode assembly.

In one embodiment of the present disclosure, the moisture-blocking film functions to prevent the infiltration of moisture from the outside to the inside, and may be selected from a metal sheet or a polymer sheet having a moisture-blocking property.

The metal sheet having a moisture-blocking property may comprise any one selected from the group consisting of iron (Fe), carbon (C), chrome (Cr), manganese (Mn), nickel (Ni), copper (Cu), aluminum (Al), an equivalent thereof and an alloy of two or more thereof, but the present disclosure is not limited thereto. Among these, the metal sheet made of iron can enhance mechanical strength, and the metal sheet made of aluminum can provide good flexibility.

The polymer sheet having a moisture-blocking property may be made of at least one selected from the group consisting of a polyethylene (PE), polypropylene, a polymer clay composite and a liquid crystal polymer.

The polymer clay composite refers to a composite obtained by dispersing plate-type clays in a polymer. Since the plate-type clays are arranged in the polymer, pathway length through which gas and the like are escaped can increase to inhibit the permeation of a gas component. Based on this principle, the polymer clay composite sheet can block moisture. Also, the liquid crystal polymer sheet is basically made of a liquid crystal polymer which has a behavior similar to a liquid crystal in its rigid segments consisting of aromatic groups. The rigid segments can block moisture infiltration by increasing pathway length, like the polymer clay composite.

In one embodiment of the present disclosure, the sealant polymer layers have thermal adhesive or thermal bonding properties, and may comprise any one selected from the group consisting of a copolymer of polypropylene-acrylic acid, a copolymer of polyethylene-acrylic acid, polypropylene chloride, a terpolymer of polypropylene-butylene-ethylene, polypropylene, polyethylene, a copolymer of ethylene-propylene, and a mixture thereof.

Also, considering low adhesiveness between the moisture-blocking film and the sealant polymer layers, an adhesive layer may be added between the moisture-blocking film and the sealant polymer layers, so as to more enhance the adhesiveness and moisture-blocking property. The adhesive layer may be made of a composition containing urethane-based materials, acrylic materials and thermoplastic elastomers, but is not limited thereto. For example, an adhesive layer is required in the case of preparing the moisture-blocking layer by way of dry lamination, while in the case that melted sealant materials are formed on a metal layer, an additional adhesive layer is not required due to sufficient adhesiveness.

Figure 3:
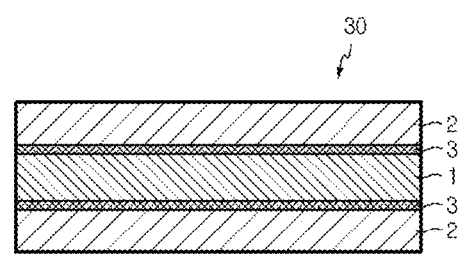
FIG. 3 is a cross-sectional view of a moisture-blocking layer before it surrounds an electrode assembly according to one embodiment of the present disclosure, the moisture-blocking layer further comprising an adhesive layer between a moisture-blocking film and sealant polymer layers, in addition to the structure of FIG. 2.

Referring to FIG. 3, adhesive layers 3 may be comprised between a moisture-blocking film 1 and each of sealant polymer layers 2 positioned on both sides of the moisture-blocking film.

The moisture-blocking layer according to a preferred embodiment of the present disclosure may comprise a mechanical supporting layer on at least one surface between the moisture-blocking film and both sealant polymer layers. The mechanical supporting layer has a great modulus to prevent cracks from being generated in the moisture-blocking layer (specifically, the moisture-blocking layer of a metal sheet) when the moisture-blocking layer is drawn (pulled by forcing). Accordingly, the rupture of the moisture-blocking layer can be controlled during continuous bending by external force, thereby more effectively blocking moisture infiltration into batteries.

The mechanical supporting layer may be made of a polymer material having a great modulus, specifically a tensile modulus value of 0.5 to 6 GPa. Examples of such a polymer material may be at least one selected from the group consisting of polyolefins, polyesters, polyimides and polyamides.

In the case that the moisture-blocking layer comprises the mechanical supporting layer, the moisture-blocking film is preferably made of a metal sheet.

Preferably, an adhesive layer may be further comprised between the moisture-blocking film and the mechanical supporting layer, and the adhesive layer should have anti-electrolytic property.

Figure 4:
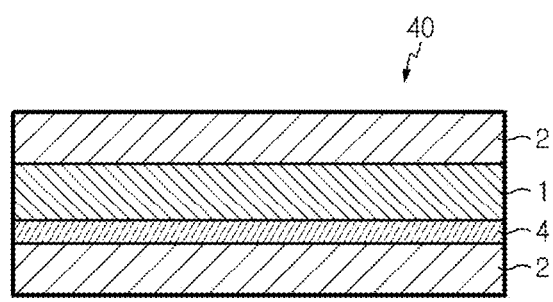
FIG. 4 is a cross-sectional view of a moisture-blocking layer before it surrounds an electrode assembly according to one embodiment of the present disclosure, the moisture-blocking layer further comprising a mechanical supporting layer, in addition to the structure of FIG. 2.
Figure 5:
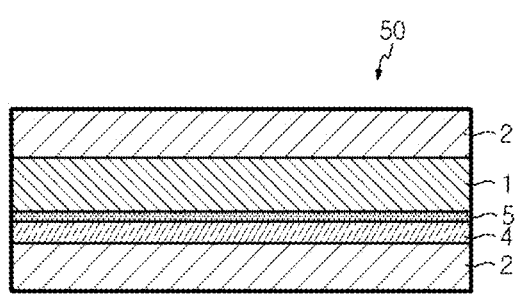
FIG. 5 is a cross-sectional view of a moisture-blocking layer before it surrounds an electrode assembly according to one embodiment of the present disclosure, the moisture-blocking layer further comprising an adhesive layer between the mechanical supporting layer and a moisture-blocking film, in addition to the structure of FIG. 4.

More specified moisture-blocking layer according to another embodiment of the present disclosure is shown in FIG. 4, which has a structure in which a sealant polymer layer 2, mechanical supporting layer 4, a moisture-blocking film 1, preferably a moisture-blocking film made of a metal sheet, and a sealant polymer layer 2 are laminated in order. Also, referring to FIG. 5, an adhesive layer 5, preferably one having anti-electrolytic property is added between the moisture-blocking film 1 and the mechanical supporting layer 4 in the structure of FIG. 5.

The moisture-blocking layer according to the present disclosure can be used alone in a cable-type secondary battery, or can be used together with a polymer resin layer which is made of various kinds of polymers and used as an outer layer of the moisture-blocking layer.

Preferably, the packaging for a cable-type secondary battery according to the present disclosure comprises a moisture-blocking layer and a heat-shrinkable tube surrounding the outer surface of the moisture-blocking layer. The heat-shrinkable tube refers to a tube which is shrunk when heated, to closely encase a terminal or a substance having a different shape or size. In the present disclosure, the moisture-blocking layer is wound on the outer surface of an electrode assembly while being overlapped in a predetermined part, and inserted into a heat-shrinkable tube. After inserting, when heat is applied, the sealant polymer of the moisture-blocking layer are melted by heat transferred from the heat-shrinkable tube and the moisture-blocking layer is sealed, while the heat-shrinkable tube is heated and shrunk, thereby providing a tight packaging having no empty space between the heat-shrinkable tube and the moisture-blocking layer surrounding the outer surface of the electrode assembly. Such a tight packaging having no empty space can enhance a moisture-blocking property by the packaging itself, and also can provide insulating property by the heat-shrinkable tube. Also, in the case that only the heat-shrinkable tube is used, moisture may be infiltrated into batteries through pores present in the heat-shrinkable tube. However, according to one embodiment of the present disclosure comprising both of the moisture-blocking layer and the heat-shrinkable tube, the effect of blocking moisture and the protection of the cable-type battery can be simultaneously obtained. In addition, when a heat-shrinkable tube made of a smooth material is formed on the moisture-blocking layer of the present disclosure, such a heat-shrinkable tube can fasten the moisture-blocking layer by close contact, to substantially lower a probability that the moisture-blocking layer is wrinkled on the surface thereof. This matter is favorable in terms of the flexibility of the battery.

Figure 6:
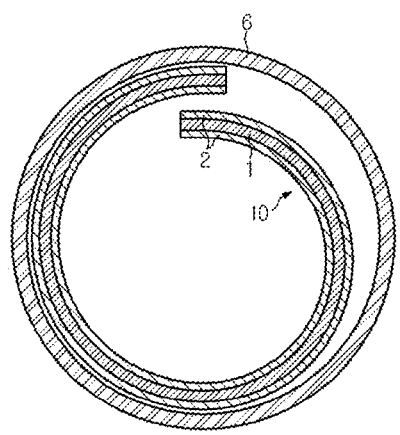
FIG. 6 shows a packaging for a cable-type secondary battery before heat-treatment according to one embodiment of the present disclosure.

FIG. 6 shows a packaging for a cable-type secondary battery, in which a moisture-blocking layer 10 having sealant polymer layers 2 on both surfaces of a moisture-blocking film 1 is wound on the outer surface of an electrode assembly while being overlapped in a predetermined part, and a heat-shrinkable tube is present in the outside of the moisture-blocking layer. When heat is applied, the sealant polymer of the moisture-blocking layer are melted by heat transferred from the heat-shrinkable tube and the moisture-blocking layer is sealed, while the heat-shrinkable tube is heated and shrunk, thereby tightly packaging the heat-shrinkable tube and the moisture-blocking layer surrounding the outer surface of the electrode assembly, without empty space between them.

In the present disclosure, commercially available heat-shrinkable tubes made of various materials and having various forms may be properly used according to the desired purpose. A shrinkage process is preferably carried out at a low temperature, for example, at a temperature of 70 to 200° C., preferably 70 to 120° C., so as to avoid the thermal damage of the lithium ion batteries. The heat-shrinkable tube may be made of any one selected from the group consisting of polyolefins such as polyethylene and polypropylene, polyesters such as polyethylene terephthalate, fluoro-containing resins such as polyvinylidene fluoride and polytetrafluoroethylene, polyvinyl chloride, and a mixture thereof.

Also, the present disclosure presents a cable-type secondary battery comprising the above-mentioned packaging.

The packaged a cable-type secondary battery according to the present disclosure comprises an electrode assembly having a horizontal cross section of a predetermined shape and extending longitudinally, which comprises an inner electrode, a separation layer surrounding the inner electrode to prevent a short circuit between electrodes, and an outer electrode; and the above-mentioned packaging surrounding the outer surface of the electrode assembly closely.

As used herein, the term 'a predetermined shape' used herein refers to not being particularly limited to any shape, and means that any shape that does not damage the nature of the present disclosure is possible. The cable-type secondary battery of the present disclosure has a horizontal cross section of a predetermined shape, a linear structure, which extends in the longitudinal direction, and flexibility, so it can freely change in shape.

According to one embodiment of the present disclosure, the packaging may be formed by closely winding the outer surface of the electrode assembly so that both ends of the electrode assembly are exposed to the outside. As the packaging is formed so that both ends of the electrode assembly are exposed to the outside, one end of the electrode assembly comes into contact with a metal tap for the inner electrode later, while the other end of the electrode assembly comes into contact with a metal tap for the outer electrode, thereby acting as a battery. These metal taps may be formed in the same manner as general batteries, and an additional sealant layer may be topically formed so as to improve insulating property.

Figure 7:
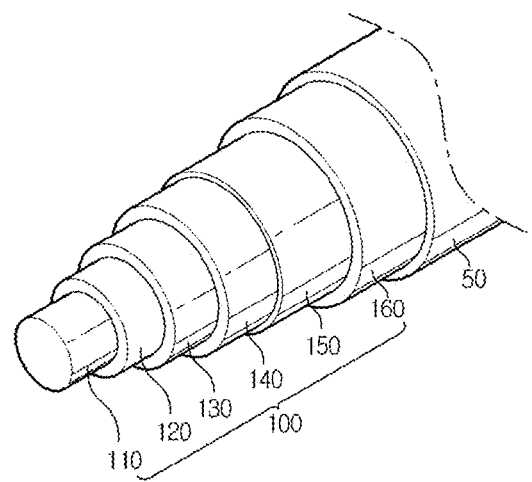
FIG. 7 is an exploded perspective view schematically showing a cable-type secondary battery comprising a packaging according to another embodiment of the present disclosure.

FIG. 7 shows a cable-type secondary battery, comprising an electrode assembly 100 which comprises an inner electrode including an inner current collector 120 and an inner electrode active material layer 130 formed on a surface of the inner current collector 120, a separation layer 140 surrounding the inner electrode to prevent a short circuit between electrodes, and an outer electrode including an outer electrode active material layer 150 formed to surround the outer surface of the separation layer and an outer current collector 160 surrounding the outer surface of the outer electrode active material layer; and a packaging 170 surrounding the outer surface of the electrode assembly closely 100, the packaging 170 is the above-mentioned packaging of the present disclosure.

Hereinafter, the electrode assembly according to the present disclosure will be more specifically described.

According to a preferred embodiment of the present disclosure, the inner electrode of the electrode assembly may comprise a core for supplying lithium ions, which comprises an electrolyte, at least one wire-form inner current collector that is wound to surround the outer surface of the core for supplying lithium ions, and an inner electrode active material layer.

The inner electrode may have a structure that the inner electrode active material layer is formed on the whole surface of the wire-form inner current collector; or a structure that the inner electrode active material layer is formed to surround the outer surface of the wound wire-form inner current collector.

Figure 8:
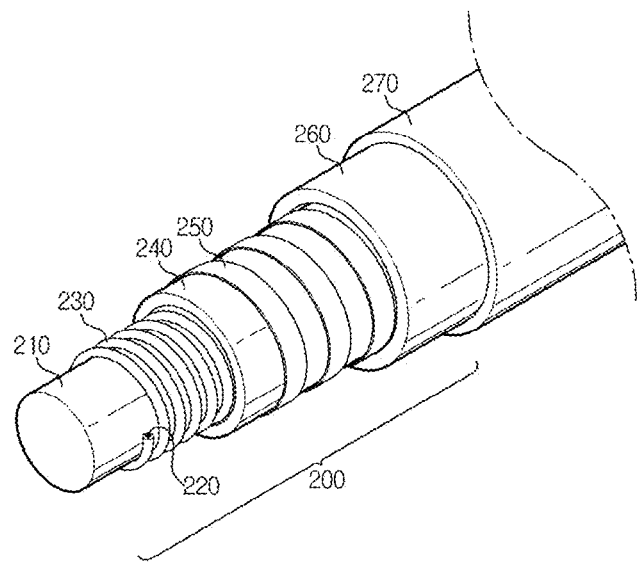
FIG. 8 is an exploded perspective view schematically showing a cable-type secondary battery comprising a packaging according to still another embodiment of the present disclosure.
Figure 9:
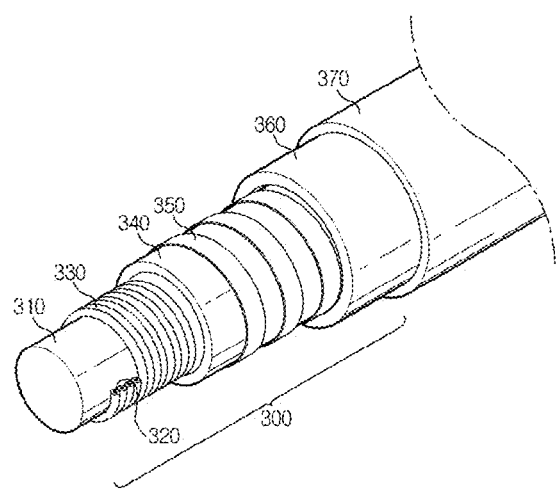
FIG. 9 is an exploded perspective view schematically showing a cable-type secondary battery comprising a packaging according to yet still another embodiment of the present disclosure.

Among these, for the structure that the inner electrode active material layer is formed on the whole surface of the wire-form inner current collector, in the case shown in FIG. 8, the inner electrode active material layer 230 may be formed on the surface of one wire-form inner current collector 220 before the wire-form inner current collector 220 is wound on the outer surface of a core 210 for supplying lithium ions, and in the case shown in FIG. 9, the inner electrode active material layer 330 may be formed on the surface of two or more wire-form inner current collectors 320 and then two or more wire-form inner current collectors 320 may be together wound while crossing with each other, which is favorable in the improvement of battery rate characteristics.

For structure that the inner electrode active material layer is formed to surround the outer surface of the wound wire-form inner current collector, a wire-form inner current collector may be wound on the outer surface of a core for supplying lithium ions, and then an inner electrode active material layer is formed to surround the wound wire-form inner current collector.

In the present disclosure, the wire-form inner current collector 220, 320, 420, 520 is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer. Such a current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), silver, palladium, nickel, etc. The conductive polymer may include polyacetylene, polyaniline, polypyrrole, polythiophene, polysulfurnitride, etc. However, the non-conductive polymer used in the current collector is not particularly limited to its kinds.

Meanwhile, the outer electrode may be formed in a structure having a sheet-form outer current collector 250, 350 wound to surround the outer surface of the separation layer 240, 340, and an outer electrode active material layer 260, 360 surrounding the outer surface of the sheet-form outer current collector 250, 350, but is not limited thereto. For example, the outer electrode may be formed in a structure having an outer electrode active material layer surrounding the outer surface of the separation layer, and a sheet-form outer current collector wound to surround the outer surface of the outer electrode active material layer; a structure having a sheet-form outer current collector wound to surround the outer surface of the separation layer, and an outer electrode active material layer surrounding the outer surface of the sheet-form outer current collector and coming into contact with the separation layer; or a structure having an outer electrode active material layer surrounding the outer surface of the separation layer, and a sheet-form outer current collector that is included inside the outer electrode active material layer by being covered therein and wound to surround the outer surface of the separation layer with spacing apart therefrom.

Figure 10:
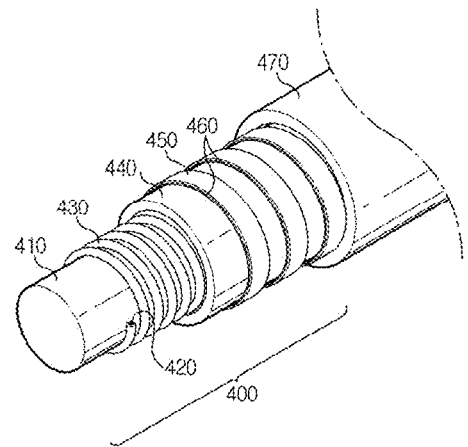
FIG. 10 is an exploded perspective view schematically showing a cable-type secondary battery comprising a packaging according to yet still another embodiment of the present disclosure.

Furthermore, before the sheet-form outer current collector is wound on the outer surface of the separation layer, the outer electrode active material layer is formed on at least one surface of the sheet-form outer current collector to obtain a sheet-form laminate, and the sheet-form laminate is wound on the outer surface of the separation layer, form the outer electrode. That is, as shown in FIG. 10, the outer electrode may be formed by winding a sheet-form laminate 450, 460, obtained the lamination of the outer electrode active material layer 460 and the sheet-form outer current collector 450, on the outer surface of the separation layer 440.

The outer current collector 250, 350, 450, 550 may be in the form of a mesh which can provide increased surface area. Such an outer current collector 250, 350, 450, 550 may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

Meanwhile, the outer current collector may have a plurality of recesses on at least one surface thereof, so as to more increase its surface area. The recesses may be continuously patterned or intermittently patterned. That is, continuous patterned recesses may be formed with spacing apart with each other in the longitudinal direction, or a plurality of holes may be formed in the form of intermittent patterns. The plurality of holes may be a circular or polygonal shape.

Figure 11:
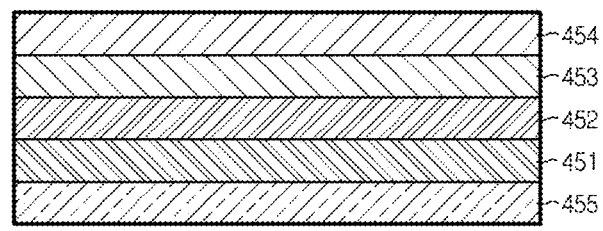
FIG. 11 is a schematic view showing a cross-section of a sheet-form outer current collector according to one embodiment of the present disclosure.

Also, according to a preferred embodiment of the present disclosure as shown in FIG. 11, the outer electrode may be a sheet-form outer electrode which comprises an outer current collector 451, an outer electrode active material layer 452 formed on one surface of the outer current collector, a conductive layer 453 formed on the top surface of the outer electrode active material layer and comprising a conductive material and a binder, a first porous supporting layer 454 formed on the top surface of the conductive layer, and a second supporting layer 455 formed on the other surface of the outer current collector.

The first supporting layer 454 may be a mesh-form porous membrane or a non-woven fabric. Such a porous structure can allow good introduction of an electrolyte solution in the outer electrode active material layer 452, and also the first supporting layer 454 itself provides superior impregnation of the electrolyte solution and the corresponding ionic conductivity, thereby inhibiting resistance increase within the battery and eventually preventing the deterioration of battery performances.

The first supporting layer 454 may be obtained from any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate, and a mixture thereof.

Meanwhile, a conductive material-coating layer having a conductive material and a binder may be further formed on the top surface of the first supporting layer 454. The conductive material-coating layer can improve the conductivity of the electrode active material layer to lower the resistance of the electrodes, thereby the deterioration of battery performances.

The conductive material and the binder may be the same as those used in the conductive layer to be described below.

Such conductive material-coating layer is more favorable when applied in a cathode because a cathode active material layer has low conductivity to intensify performance deterioration due to electrode resistance rise, than in an anode whose active material layer has relatively good conductivity and thus is not largely affected by the conductive material-coating layer to exhibit performances similar to conventional anodes.

In the conductive material-coating layer, the conductive material and the binder may be present in a weight ratio of 80:20 to 99:1. The use of large amounts of binder may induce a severe rise in electrode resistance. Therefore, when such a numerical range is satisfied, electrode resistance can be prevented from its severe rise. Also, as mentioned above, since the first supporting layer acts as a buffer which can prevent the release of an electrode active material layer, electrode flexibility is not largely affected by the use of the binder in a relative small amount.

Meanwhile, the second supporting layer 455 may be a polymer film which may be made of any one selected from the group consisting of polyolefin resins, polyester resins, polyimide resins, polyamide resins, and a mixture thereof.

Meanwhile, the conductive layer 453 may have a porous structure for good introduction of an electrolyte solution in an electrode active material layer, and have a pore size of 0.01 to 5 μm and a porosity of 5 to 70%.

The conductive material may comprise any one selected from the group consisting of carbon black, acetylene black, ketjen black, carbon fiber, carbon nanotube, graphene and a mixture thereof, but is not limited thereto.

The binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof, but is not limited thereto.

Meanwhile, the core 110, 210, 310, 410, 510 for supplying lithium ions comprise an electrolyte, and the electrolyte may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc), but is not limited thereto. The electrolyte may further comprise a lithium salt which may be selected from LiCl, LiBr, LiI, $LiClO_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

Such a core 110, 210, 310, 410, 510 for supplying lithium ions may consist of only an electrolyte, and especially a liquid electrolyte may be formed by using a porous carrier. The inner electrode may be an anode or a cathode, and the outer electrode may be a cathode or an anode corresponding thereto. In the present disclosure, the electrode active material layers allow ions to move through the current collector, and the movement of ions is caused by the interaction of ions such as intercalation/deintercalation of ions into and from the electrolyte layer.

These electrode active material layers may be divided into an anode active material layer and a cathode active material layer.

Specifically, when the inner electrode is an anode and the outer electrode is a cathode, the inner active material layer thereof may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; an alloy of the metals; an oxide (MeOx) of the metals; a complex of the metals and carbon; and a mixture thereof, and the outer active material layer thereof may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner active material layer becomes a cathode active material layer and the outer active material layer becomes an anode active material layer.

The electrode active material layer comprises an electrode active material, a binder and a conductive material, and is combined with a current collector to form an electrode. If the electrode is subject to deformation via folding or severe bending by external force, the electrode active material may be released. Such a release of the electrode active material deteriorates battery performances and decreases battery capacity. However, the wound sheet-form outer current collector has elasticity to disperse force during deformation by external force. Thereby, the electrode active material layer is less deformed to prevent the release of an active material.

In the present disclosure, the separation layer 140, 240, 340, 440, 540 may be an electrolyte layer or a separator. The electrolyte layer serving as an ion channel may be made of a gel-type polymer electrolyte using PEO, PVdF, PVdF-HFP, PMMA, PAN or PVAc, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve poor mechanical properties. The electrolyte layer of the present disclosure can serve as a separator, and thus an additional separator may be omitted.

In the present disclosure, the electrolyte layer may further comprise a lithium salt. The lithium salt can improve an ionic conductivity and response time. Non-limiting examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

Examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer. Among these, in order for the lithium ions of the core for supplying lithium ions to be transferred to the outer electrode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

Hereinafter, a method for preparing a cable-type secondary battery will be explained with reference to FIG. 10.

First, a wire-form inner current collector 420 in which an inner electrode active material layer 430 is formed on the surface of the inner current collector is wound to obtain a hollow inner electrode whose central part is empty. The formation of the inner electrode active material layer 430 on the surface of the wire-form inner current collector 420 may be made by conventional coating methods, for example, by an electroplating process or an anodic oxidation process. Also, it is preferable to carry out coating methods in which an electrode slurry containing an active material is applied through a comma coater or a slot die coater. In addition, the electrode slurry containing an active material may be applied by way of dip coating or extrusion-coating using an extruder.

Subsequently, a separation layer 440 for preventing a short circuit is formed by to surround the outer surface of the inner electrode. Then, an outer electrode active material layer 460 is formed on one surface of a sheet-form outer current collector 450 to obtain a sheet-form laminate 450, 460, and the sheet-form laminate 450, 460 is wound on the outer surface of the separation layer 440, to form an outer electrode. Thereby, an electrode assembly is prepared.

Next, an electrolyte solution is introduced in the empty central part of the inner electrode to form a core 410 for supplying lithium ions.

Thus, the core 410 for supplying lithium ions may be formed by carrying out the introduction of an electrolyte solution after a packaging 470 is formed on the outer surface of the electrode assembly, but the core 410 may be formed in a wire form by introducing a polymer electrolyte using an extruder before forming the wound wire-form inner electrode, may be formed by providing a wire-form carrier made of a sponge material and introducing a non-aqueous electrolyte solution therein, or may be formed by introducing a non-aqueous electrolyte solution in the empty space of the inner electrode center after providing the inner electrode.

Finally, the introduction part of the electrolyte solution is completely sealed to prepare a cable-type secondary battery.

Hereinafter, another embodiment of the present disclosure will be described with reference to FIG. 12.

Figure 12:
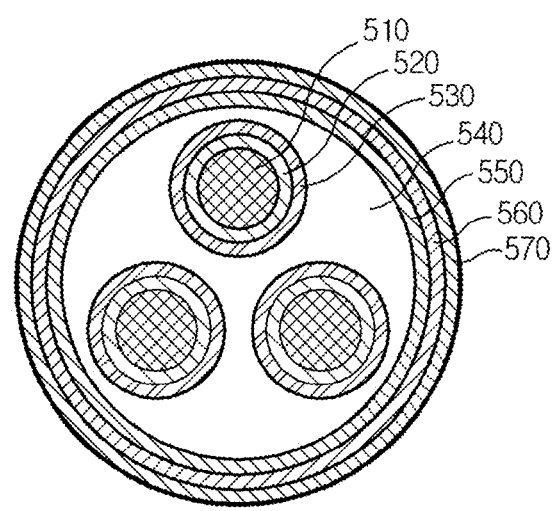
FIG. 12 shows a cross-section of a cable-type secondary battery having two or more inner electrodes according to another embodiment of the present disclosure.

Referring to FIG. 12, a cable-type secondary battery according to one embodiment of the present invention comprises an electrode assembly having a horizontal cross section of a predetermined shape and extending longitudinally, which comprises two or more cores 510 for supplying lithium ions, which comprise an electrolyte; two or more inner electrodes arranged in parallel to each other, each inner electrode having one or more wire-form inner current collectors 520 wound to surround the outer surface of each core 510 for supplying lithium ions and an inner electrode active material layer 530 formed on the surface of the wire-form inner current collectors 520, a separation layer 540 surrounding the outer surface of the inner electrode to prevent a short circuit, and an outer electrode having a sheet-form outer current collector 550 wound to surround the outer surface of the separation layer 540 and an outer electrode active material layer 560; and a packaging 570 of the present disclosure which surrounds the outer surface of the electrode assembly closely.

Since such a cable-type secondary battery has a plurality of inner electrodes, the number of the inner electrodes can be adjusted to control the loading amount of the electrode active material layers as well as battery capacity, and a probability of short circuit can be prevented owing to the presence of multiple electrodes.

Further, the present disclosure provides a method for preparing a cable-type secondary battery, comprising (S1) providing an electrode assembly having a horizontal cross section of a predetermined shape and extending longitudinally, which comprises an inner electrode, a separation layer surrounding the inner electrode to prevent a short circuit between electrodes, and an outer electrode surrounding the outer surface of the separation layer;

(S2) providing a moisture-blocking layer having a length longer than the perimeter of the outer surface of the electrode assembly and comprising sealant polymer layers on both outer surfaces of the moisture-blocking film and a moisture-blocking film disposed between the sealant polymer layers;

(S3) surrounding the outer surface of the electrode assembly with the moisture-blocking layer so that the sealant polymer layers in both ends of the moisture-blocking layer are overlapped with each other in a predetermined part; and (S4) bringing the electrode assembly surrounded with the moisture-blocking layer into heat-treatment, thereby adhering the overlapped part of the sealant polymer layers at both ends of the moisture-blocking layer.

Preferably, the moisture-blocking layer provided in the step (S2) may comprise a mechanical supporting layer on at least one surface between the moisture-blocking film and both sealant polymer layers, and also the moisture-blocking layer provided in the step (S2) may have a structure in which a sealant polymer layer, a mechanical supporting layer, a metal sheet of moisture-blocking layer and another sealant polymer layer are laminated in order.

In the present disclosure, the moisture-blocking layer having a length longer than the perimeter of the outer surface of the electrode assembly is constructed so that the sealant layers in both ends of the moisture-blocking layer are overlapped in a predetermined part. For example, the length longer than the perimeter of the outer surface of the electrode assembly may be 1 to 99%, preferably 1 to 70%, more preferably 3 to 50%, most preferably 5 to 30% of the outer surface perimeter of the electrode assembly.

Also, according to another embodiment of the present disclosure, the step (S4) may comprise inserting the electrode assembly surrounded with the moisture-blocking layer in a heat-shrinkable tube prior to the heat-treatment, thereby bonding the heat-shrinkable tube to the electrode assembly surrounded with the moisture-blocking layer by the shrinkage of the tube, while adhering the overlapped part of the sealant polymer layers at both ends of the moisture-blocking layer.

Preparation of Packaged Cable-Type Secondary Battery

Example 1

A slurry containing graphite/Denka black/PVdF (=70/5/25 wt %) was coated on a 250 μm Cu wire, to obtain a wire-form electrode having a graphite electrode layer. Four wire-form inner electrodes obtained were wound to prepare a spring-type inner electrode whose inside is empty, so a core for supplying lithium ions can be inserted therein. Then, a separator was wound to surround the inner electrodes to form a separation layer. A slurry of $LiCoO_2$/Denka black/PVdF (=85/5/15 wt %) was coated on an Al-foil, on which a slurry (Denka black/PVdF=40/60) for a conductive layer was coated, and a non-woven fabric as a porous polymer substrate was placed on the slurry for the conductive layer, followed by drying, to obtain a sheet-form outer electrode. The sheet-form outer electrode obtained was cut into a piece with a width of 2 mm, and wound to surround the inner electrode/the separation layer, to obtain an electrode assembly.

Meanwhile, an Al-sheet as a moisture-blocking film, sealant polymer layers of polypropylene to be formed as both sides, and a mechanical supporting layer of PET were used to obtain a moisture-blocking layer (PP/PET/Al-sheet/PP). The moisture-blocking layer was primarily wound to surround the electrode assembly obtained above so that some parts of the moisture-blocking layer were overlapped with each other to form an overlapped 'O' shape. In this process, the electrode assembly provided with the moisture-blocking layer is placed in a mold whose upper and lower parts are U-shaped, following by heating and compressing under the conditions of 150° C. and a load of 50 kg for 3 seconds, to bond the sealant polymer layers (At this time, an inlet for introducing an electrolyte solution was maintained without sealing). Through unsealed parts, a non-aqueous electrolyte solution (1 M $LiPF_6$, EC/PC/DEC) was introduced in the center of the inner electrode using a syringe, to form a core for supplying lithium ions, followed by completely sealing for unsealed parts of the moisture-blocking layer.

Figure 14:
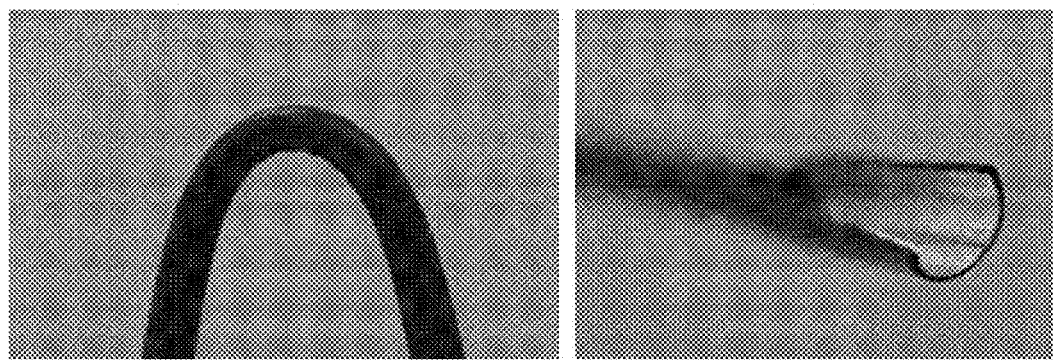
FIG. 14 is a photograph showing the outer surface of a packaging for a cable-type secondary battery according to one embodiment of the present disclosure, in which a moisture-blocking layer and a heat-shrinkable tube are applied.

Then, a heat-shrinkable tube of PET was applied at 150° C. for one minute so that the moisture-blocking layer was sealed and the heat-shrinkable tube was shrunk to form a tight packaging on the outer surface of the electrode assembly. Thereby, a packaged cable-type secondary battery was prepared. The outer surface of the packaging used in the cable-type secondary battery is shown in the photograph of FIG. 14.

Example 2

Figure 15:
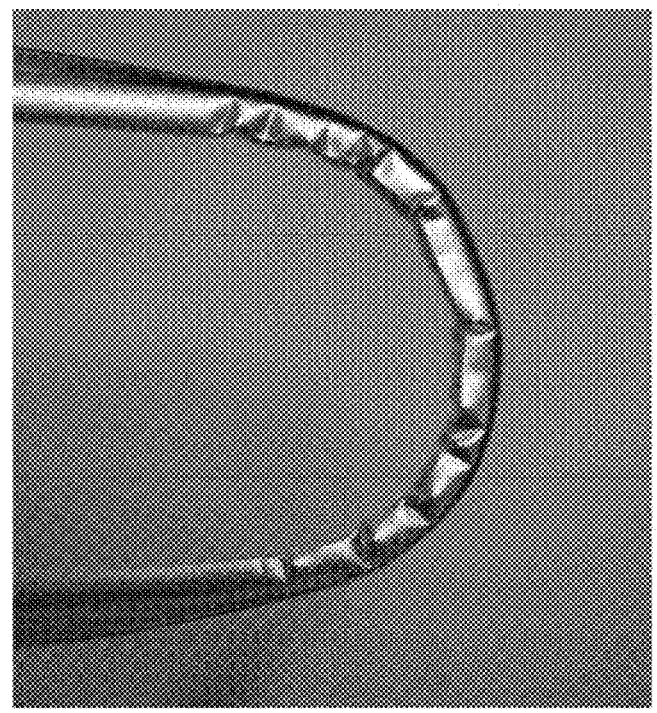
FIG. 15 is a photograph showing the outer surface of a packaging for a cable-type secondary battery according to one embodiment of the present disclosure, in which only a moisture-blocking layer is applied.

The procedures of Example 1 were repeated except that only the moisture-blocking layer (PP/PET/Al-sheet/PP) was applied in the electrode assembly in the absence of the heat-shrinkable tube of PET, to form a packaging. Thereby, a packaged cable-type secondary battery was prepared. The used packaging is shown in the photograph of FIG. 15.

Comparative Example 1

The procedures of Example 1 were repeated except that only the heat-shrinkable tube of PET was applied in the electrode assembly in the absence of the moisture-blocking layer to form a packaging. Thereby, a packaged cable-type secondary battery was prepared.

Comparative Example 2

The procedures of Example 1 were repeated except that a sealant polymer layer was formed on only one surface of the moisture-blocking layer, not being 3-layered, and then applied in the electrode assembly to form a packaging. Thereby, a packaged cable-type secondary battery was prepared.

Comparative Example 3

The procedures of Example 1 were repeated except that the moisture-blocking layer was applied in the electrode assembly in the form that some parts were not overlapped (a tube form), to form a packaging. Thereby, a packaged cable-type secondary battery was prepared.

Test Example

Figure 13:
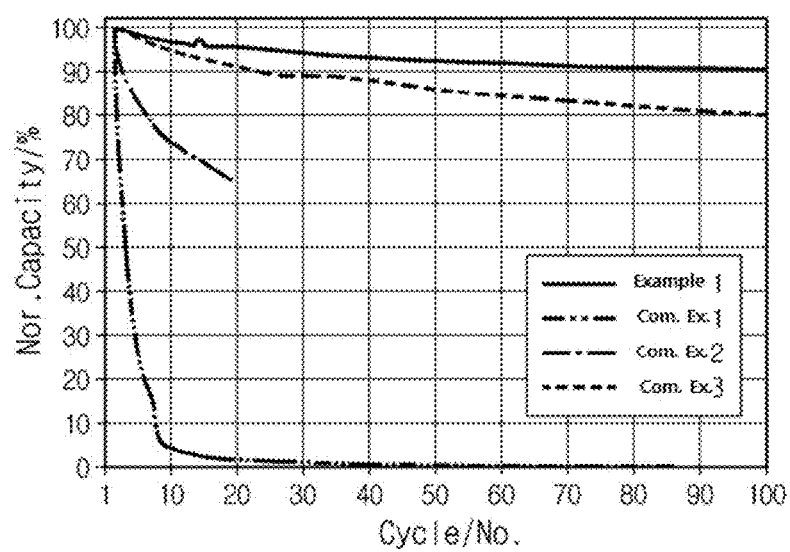
FIG. 13 is a graph showing the life characteristics of a cable-type secondary battery having a packaging according to one embodiment of the present disclosure, and secondary batteries with any other packaging.

For the cable-type secondary batteries prepared in the Examples and the Comparative Examples, charge/discharge processes were carried out with a current density of 0.5 C at a voltage condition of 4.2 to 3.0 V. The results thereof are shown in FIG. 13. As shown in FIG. 13, the battery of Examples having the moisture-blocking layer exhibited superior life characteristics than the battery of Comparative Example 1 having only the heat-shrinkable tube. Such a packaging can be used in cable-type batteries to effectively inhibit the deterioration of life characteristics by moisture.

Also, comparing the battery of Example 1 with the battery of Comparative Example 2 having a sealant layer on only one surface of the moisture-blocking layer and the battery of Comparative Example 3 having the un-overlapped moisture-blocking layer, it was confirmed that the packaging according to Example 1 can effectively inhibit the deterioration of life characteristics by moisture.

EXPLANATION OF REFERENCE NUMERALS

1: Moisture-blocking film
2: Sealant polymer layer
3: Adhesive layer between moisture-blocking film and sealant polymer layer
4: Mechanical supporting layer
5: Adhesive layer between moisture-blocking film and mechanical supporting layer
6: Heat-shrinkable tube
10, 20, 30, 40, 50: Moisture-blocking layer
30, 170, 270, 370, 470, 570: Packaging for cable-type secondary battery
210, 310, 410, 510: Core for supplying lithium ions
120, 220, 320, 420, 520: Inner current collector
130, 230, 330, 430, 530: Inner electrode active material layer
140, 240, 340, 440, 540: Separation layer
150, 250, 350, 450, 550: Outer electrode active material layer
160, 260, 360, 460, 560: Outer current collector
451: Outer current collector
452: Outer electrode active material layer
453: Conductive layer
454: First supporting layer
455: Second supporting layer

What is claimed is:

1. A packaging for a cable-type secondary battery, surrounding an electrode assembly in the cable-type secondary battery, the packaging having a moisture-blocking layer comprising sealant polymer layers on both outer surfaces of a moisture-blocking film,
wherein the moisture-blocking layer is a tube form surrounding the electrode assembly, and one of the sealant polymer layers at a first end of the moisture-blocking layer and the other of the sealant polymer layers at a second end of the moisture-blocking layer are adhered at predetermined parts that overlap each other.

2. The packaging according to claim 1, wherein the moisture-blocking layer comprises a metal sheet or a polymer sheet.

3. The packaging according to claim 2, wherein the metal sheet comprises any one selected from the group consisting of iron (Fe), carbon (C), chrome (Cr), manganese (Mn), nickel (Ni), copper (Cu), aluminum (Al), an equivalent thereof and an alloy of two or more thereof.

4. The packaging according to claim 2, wherein the polymer sheet is made of at least one selected from the group consisting of a polyethylene (PE), polypropylene(PP), a polymer clay composite and a liquid crystal polymer.

5. The packaging according to claim 1, wherein the sealant polymer layers comprise any one selected from the group consisting of a copolymer of polypropylene-acrylic acid, a copolymer of polyethylene-acrylic acid, polypropylene chloride, a terpolymer of polypropylene-butylene-ethylene, polypropylene, polyethylene, a copolymer of ethylene-propylene, and a mixture thereof.

6. The packaging according to claim 1, wherein the moisture-blocking layer comprises an adhesive layer between the moisture-blocking film and at least one of the sealant polymer layers.

7. The packaging according to claim 1, which further comprises a heat-shrinkable tube that surrounds an outer surface of the moisture-blocking layer.

8. The packaging according to claim 7, wherein the heat-shrinkable tube comprises at least one selected from the group consisting of polyolefins, polyesters, fluoro-containing resins, and polyvinyl chloride (PVC).

9. The packaging according to claim 1, wherein the moisture-blocking layer comprises a mechanical supporting layer between the moisture-blocking film and at least one of the sealant polymer layers.

10. The packaging according to claim 9, wherein the moisture-blocking layer has a structure in which one of the sealant polymer layers, the mechanical supporting layer, a metal sheet of moisture-blocking layer, and another of the sealant polymer layers are laminated in order.

11. The packaging according to claim 9, wherein the mechanical supporting layer is at least one polymer selected from the group consisting of polyolefins, polyesters, polyimides and polyamides.

12. The packaging according to claim 9, wherein the moisture-blocking layer comprises a metal sheet.

13. The packaging according to claim 9, wherein an adhesive layer is further formed between the moisture-blocking film and the mechanical supporting layer.

14. The packaging according to claim 9, which further comprises a heat-shrinkable tube that surrounds an outer surface of the moisture-blocking layer.

15. A cable-type secondary battery, comprising:
an electrode assembly having an inner electrode, a separation layer surrounding the inner electrode to prevent a short circuit between electrodes, and an outer electrode formed to surround an outer surface of the separation layer; and
the packaging according to claim 1 which surrounds an outer surface of the electrode assembly.

16. The cable-type secondary battery according to claim 15, wherein the packaging is formed by winding the outer surface of the electrode assembly so that both ends of the electrode assembly are exposed to the outside.

17. The cable-type secondary battery according to claim 15, wherein the inner electrode of the electrode assembly comprises a core for supplying lithium ions, which comprises an electrolyte, at least one wire-form inner current collector that is wound to surround an outer surface of the core for supplying lithium ions, and an inner electrode active material layer.

18. The cable-type secondary battery according to claim 17, wherein the inner electrode has a structure that the inner electrode active material layer is formed on a whole surface of the wire-form inner current collector; or a structure that the inner electrode active material layer is formed to surround an outer surface of the wound wire-form inner current collector.

19. The cable-type secondary battery according to claim 15, wherein the outer electrode is formed in a structure having a sheet-form outer current collector wound to surround the outer surface of the separation layer, and an outer electrode active material layer surrounding an outer surface of the sheet-form outer current collector; a structure having an outer electrode active material layer surrounding the outer surface of the separation layer, and a sheet-form outer current collector wound to surround an outer surface of the outer electrode active material layer; a structure having a sheet-form outer current collector wound to surround the outer surface of the separation layer, and an outer electrode active material layer surrounding the outer surface of the sheet-form outer current collector and coming into contact with the separation layer; or a structure having an outer electrode active material layer surrounding the outer surface of the separation layer, and a sheet-form outer current collector that is included inside the outer electrode active material layer by being covered therein and wound to surround the outer surface of the separation layer with spacing apart therefrom.

20. The cable-type secondary battery according to claim 15, wherein the outer electrode is formed by winding a sheet-form outer electrode to surround the outer surface of the separation layer, the sheet-form outer electrode being formed by the bonding of an outer electrode active material layer and a sheet-form outer current collector.

21. The cable-type secondary battery according to claim 15, wherein the outer electrode is a sheet-form outer electrode which comprises an outer current collector, an outer electrode active material layer formed on one surface of the outer current collector, a conductive layer formed on a surface of the outer electrode active material layer and comprising a conductive material and a binder, a first porous supporting layer formed on a surface of the conductive layer, and a second supporting layer formed on another surface of the outer current collector.

22. The cable-type secondary battery according to claim 15, wherein the outer current collector is in the form of a mesh.

23. The cable-type secondary battery according to claim 15, wherein the electrode assembly comprises a core for supplying lithium ions, which comprises an electrolyte; the inner electrode, comprising one or more wire-form inner current collectors which are wound to surround an outer surface of the core for supplying lithium ions, and an inner electrode active material layer formed on surfaces of the one or more wire-form inner current collectors; the separation layer surrounding an outer surface of the inner electrode; and the outer electrode as a sheet-form outer electrode comprising an outer current collector, an outer electrode active material layer formed on one surface of the outer current collector, a conductive layer formed on a surface of the outer electrode active material layer and comprising a conductive material and a binder, a first porous supporting layer formed on a surface of the conductive layer, and a second supporting layer formed on another surface of the outer current collector.

24. The cable-type secondary battery according to claim 15, wherein the inner electrode is an anode or a cathode, and the outer electrode is a cathode or an anode corresponding thereto.

25. The cable-type secondary battery according to claim 15, wherein the separation layer is an electrolyte layer or a separator.

26. A method for preparing a cable-type secondary battery, comprising
  (S1) providing an electrode assembly having an inner electrode, a separation layer surrounding the inner electrode to prevent a short circuit between electrodes, and an outer electrode surrounding an outer surface of the separation layer;
  (S2) providing a moisture-blocking layer having a length longer than a perimeter of an outer surface of the electrode assembly and comprising sealant polymer layers on both outer surfaces of a moisture-blocking film;
  (S3) surrounding the outer surface of the electrode assembly with the moisture-blocking layer so that one of the sealant polymer layers at a first end of the moisture-blocking layer and the other of the sealant polymer layers at a second end of the moisture-blocking layer are adhered at predetermined parts that overlap each other, such that the moisture-blocking layer is a tube form surrounding the electrode assembly; and
  (S4) heat-treating the electrode assembly surrounded with the moisture-blocking layer, thereby adhering the overlapped part of the sealant polymer layers at both ends of the moisture-blocking layer.

27. The method according to claim 26, wherein the moisture-blocking layer provided in the step (S2) comprises a mechanical supporting layer between the moisture-blocking film and at least one of the sealant polymer layers.

28. The method according to claim 26, wherein the moisture-blocking layer provided in the step (S2) has a structure in which one of the sealant polymer layers, a mechanical supporting layer, a metal sheet of moisture-blocking layer, and another of the sealant polymer layers are laminated in order.

29. The method according to claim 26, wherein the step (S4) further comprises inserting the electrode assembly surrounded with the moisture-blocking layer in a heat-shrinkable tube prior to the heat-treatment, thereby bonding the heat-shrinkable tube to the electrode assembly surrounded with the moisture-blocking layer by the shrinkage of the tube, while adhering the overlapped part of the sealant polymer layers at both ends of the moisture-blocking layer.

30. The packaging according to claim 1, wherein both sealant polymer layers have thermal adhesive or thermal bonding properties, and both sealant polymer layers include at least one selected from the group consisting of a copolymer of polypropylene-acrylic acid, a copolymer of polyethylene-acrylic acid, polypropylene chloride, a terpolymer of polypropylene-butylene-ethylene, polypropylene, polyethylene, a copolymer of ethylene-propylene, and a mixture thereof.

* * * * *